US010404595B2

(12) United States Patent
Ranjan et al.

(10) Patent No.: US 10,404,595 B2
(45) Date of Patent: Sep. 3, 2019

(54) MESSAGE ROUTING TO DEVICES WITH NON-ROUTABLE ADDRESSES (71) Applicant: T-Mobile USA, Inc., Bellevue, WA (US)

(72) Inventors: Nilesh Ranjan, Sammamish, WA (US); Daniel Vishoot, Seattle, WA (US); Babak Namiranian, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/826,618

(22) Filed: Nov. 29, 2017

(65) Prior Publication Data

US 2019/0166047 A1  May 30, 2019

(51) Int. Cl.
H04L 1/16 (2006.01)
H04L 12/741 (2013.01)
H04L 29/12 (2006.01)
H04L 29/08 (2006.01)
H04W 12/08 (2009.01)
H04W 4/70 (2018.01)

(52) U.S. Cl.
CPC ........ H04L 45/745 (2013.01); H04L 61/1541 (2013.01); H04L 61/1588 (2013.01); H04L 61/2567 (2013.01); H04L 67/12 (2013.01); H04W 4/70 (2018.02); H04W 12/08 (2013.01)

(58) Field of Classification Search
CPC ....... G06F 9/448; G06F 21/56; G06Q 10/103; H04L 61/10; H04L 41/0803; H04L 67/34; H04L 67/125; H04L 63/105; H04L 63/0227; H04L 63/1416

USPC ................. 370/328, 338, 389, 392
See application file for complete search history.

(56) References Cited

U.S. PATENT DOCUMENTS

2007/0275738 A1  11/2007  Hewes et al.
2012/0302229 A1  11/2012  Ronneke
2013/0010789 A1*  1/2013  Zhang ................. H04L 12/4641
                                                        370/389
2014/0206403 A1  7/2014  Buckley et al.
(Continued)

OTHER PUBLICATIONS

International Searching Authority, International Search Report and Written Opinion, PCT Patent Application PCT/2018/062996, dated Mar. 12, 2019, 11 pages.

Primary Examiner — Phuoc H Doan
(74) Attorney, Agent, or Firm — Perkins Coie LLP (57) ABSTRACT The disclosed system provides for machine-to-machine routing of messages (e.g., text messages, binary information, etc.) between devices (e.g., external applications, IoT devices, etc.) using non-routable identifiers. The systems and methods publish an application programming interface (API) configured to receive (non-routable) identification information of a target device from an external application (e.g., an IoT Service Provider) that calls the API, determines whether a target device associated with the identification information is a subscriber of a telecommunications service provider that provides telecommunications plans to subscribers of the telecommunications service provider, verifies that the external application is authorized to transmit messages to the target device, and translates the non-routable identification information to a mapped device address that can be used to determine a location of the target device so that the message can be delivered to the target device.

20 Claims, 7 Drawing Sheets (56) References Cited

U.S. PATENT DOCUMENTS

2016/0205106 A1    7/2016  Yacoub et al.
2017/0026774 A1    1/2017  Koshimizu et al.
2018/0262388 A1*   9/2018  Johnson .................. G06F 9/448

* cited by examiner

| Destination Address | Profile ID | Profile Status | Mapped Device Address |
|---|---|---|---|
| (012)-123-4567 | ABCD0123 | Inactive | 232037012 |
| (012)-123-4567 | ACBN5392 | Active | 232037012 |
| (123)-579-2416 | ZYXP4571 | Active | 232037156 |
| ... | ... | ... | ... |

*FIG. 5*

| Profile ID | Profile Status | Authorized Originating Entity | Profile Name | Status Date |
|---|---|---|---|---|
| ABCD0123 | Inactive | Company 1 Identifier | Default | Date-Time |
| ACBN5392 | Active | Company 1 Identifier | Registered | Date-Time |
| ZYXP4571 | Active | Company 2 Identifier | Default | Date-Time |
| ... | ... | ... | ... | ... |

MESSAGE ROUTING TO DEVICES WITH NON-ROUTABLE ADDRESSES

BACKGROUND

Modern communication networks and electronic devices have changed the way individuals in society interact and communicate. As these networks and devices have evolved so has the connectivity between user devices, networks of sensors, vehicles, buildings, appliances, machines, consumer goods and other items. This type of connectivity between objects is referred to as the Internet of Things (IoT). Typically each IoT device is assigned a unique identifier (e.g., Mobile Station International Subscriber Directory Number (MSISDN) or International Mobile Subscriber Identity (IMSI)). This unique identifier is used by a network provider (e.g., via a messaging platform such as a Short Message Service Center (SMSC)) to deliver messages to an identified target device. These unique identifiers follow a specific format and are of a maximum defined length (e.g., both MSISDN and IMSI cannot be longer than a 15 digit number). While these unique identifiers are sufficient to cater to the current device population (e.g., mobile devices, IoTs, etc.), with the proliferation of IoTs, it is becoming difficult, and will soon become impossible, to assign these unique numbers to each device, for routine messages (e.g., delivery of system messages) because the current number assignment system will be unable to keep up with the demand of billions, if not trillions of IoT devices.

Moreover, each IoT device is generally associated with at least two different unique identifiers. A first unique identifier is assigned to an IoT device when the device is first provisioned. This identifier is generally used only once by the IoT device to initially connect to a service provider (e.g., for activation) and to download a service profile. A second unique identifier is assigned to the IoT device, after activation, and associated with a working profile. Since reusability of these unique identifiers is challenging, provisioning an IoT device with at least two identifiers, one of which is used only once, further exacerbates the problem of number assignment to the growing number of IoT devices because essentially the first unique identifier is wasted after the IoT device is activated with a service profile (e.g., resulting in wastage of limited resources (telephone numbers, MSISDNs, IMSIs, etc.) that can otherwise be used to route phone calls/messages from a person to person.

BRIEF DESCRIPTION OF THE DRAWINGS

Embodiments of the disclosed technology will be described and explained through the use of the accompanying drawings.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments relate to systems and methods for machine-to-machine routing of messages (e.g., text messages, binary information, etc.) between devices (e.g., external applications, IoT devices, etc.). A device may be associated with one or more unique identifiers, such as Integrated Circuit Card Identifier (ICCID), MSISDN, IMSI, IP addresses, embedded identifiers, Apple's Chip Serial Number (CSN), IMEI, serial numbers, phone numbers, SIP URIs, tel URI, Generic Network Access Identifiers (e.g., as defined by RFC 4282), web style identifiers, etc. or any combination of the above. The unique identifiers (and associated profiles) can be embedded on the device's universal integrated-circuit card (eUICC).

The systems and methods publish an application programming interface (API) configured to receive (non-routable) identification information of a target device from an external application (e.g., an IoT Service Provider) that calls the API, determines whether a target device associated with the identification information is authorized to access a telecommunications network managed by a telecommunications service provider that provides telecommunications services to subscribers, verifies that the external application is authorized to transmit messages to the target device, and translates the non-routable identification information to a mapped device address that can be used to determine a location of the target device so that the message can be delivered to the target device.

In an example scenario, a third-party (e.g., an IoT service provider or application) transmits a message (encrypted or unencrypted) to an API associated with a message routing platform (e.g., a platform managed by a telecommunications service provider) for delivery to a target device. The target device can be associated with a destination address that is otherwise not directly routable either nationally and/or internationally (e.g., the target device is associated with a telephone number of the following format: (012)-XXX-XXXX that is not accepted by the network as a valid identifier for message routing). For example, if a delivery attempt is made between operators to deliver a call or text to a number such as 1-010-123-1234, it would fail as an invalid number. The destination address may be in one or more of the formats mentioned above.

The message routing platform verifies that the third-party is authorized to send messages to the target device, and translates the non-routable destination address to a mapped device address associated with the target device. The mapped device address may be in one or more of the formats mentioned above. The mapped device address may be maintained internally by the message routing platform (or by another third party) and may not be published to external parties (e.g., the third-party that originated the message). The table below provides examples of translations performed by the message routing platform based on the type of identifier of the non-routable destination address.

TABLE 1

| Non-routable Destination Address of the Target Device | Example Translation |
|---|---|
| IMEI | Lookup in Equipment Identity Register (EIR) and find associated IMSI. Can further lookup assigned non-routable MSISDN against IMSI, submit for delivery |
| IP Address | Lookup in Policy and Charging Rules Function (PCRF) and/or Authentication, Authorization, and Accounting (AAA) for assigned user for given address. IMSI/MSISDN can be derived from Home Local Register (HLR)/Home Subscriber Server (HSS) |
| ICCID | Query billing system to find MSISDN/IMSI or can query OTA platform for IMSI and use HLR/HSS to find MSISDN |
| Equipment Identifier (EID) | Query DP+ for ICCID and state. Follow ICCID query from here |
| SIP URI | If user given then use AAA or HLR/AUC to derive the IMSI and subsequently MSISDN for delivery |

The message routing platform then submits the message for routing to an appropriate node in the communications network (e.g., the SMSC). The SMSC queries the network of the telecommunications service provider for the location (e.g., stored in the Visitor Location Register (VLR)) of the target device (e.g., by constructing a Send Routing Information for Short Message (SRI_SM) toward Home Local Register (HLR) via Signal Transfer Point (STP) with the mapped device address).

The message routing platform may also query one or more network nodes to discover the best identity to use to deliver the message to the target device. For example, a message sent to a number that is associated with an inactive profile will not be delivered by the message routing platform. Instead, the message routing platform attempts to discover a current active profile associated with the target device and uses that information to identify an appropriate unique identifier to be used to route the message(s) to the target device. The message routing platform then internally maps the non-routable number to the identified unique identifier associated with the target device, and forwards the message to the target device using the identified unique identifier. The message routing platform can also send an acknowledgement to the originating third-party once the message is successfully delivered to the target device. In this manner, non-routable numbers (or other unique identifiers) can be utilized to service a highly scalable machine-to-machine message routing platform.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to passive privacy breach notifications, embodiments of the present technology are equally applicable creating additional notifications in response to various triggering events.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Figure 1:
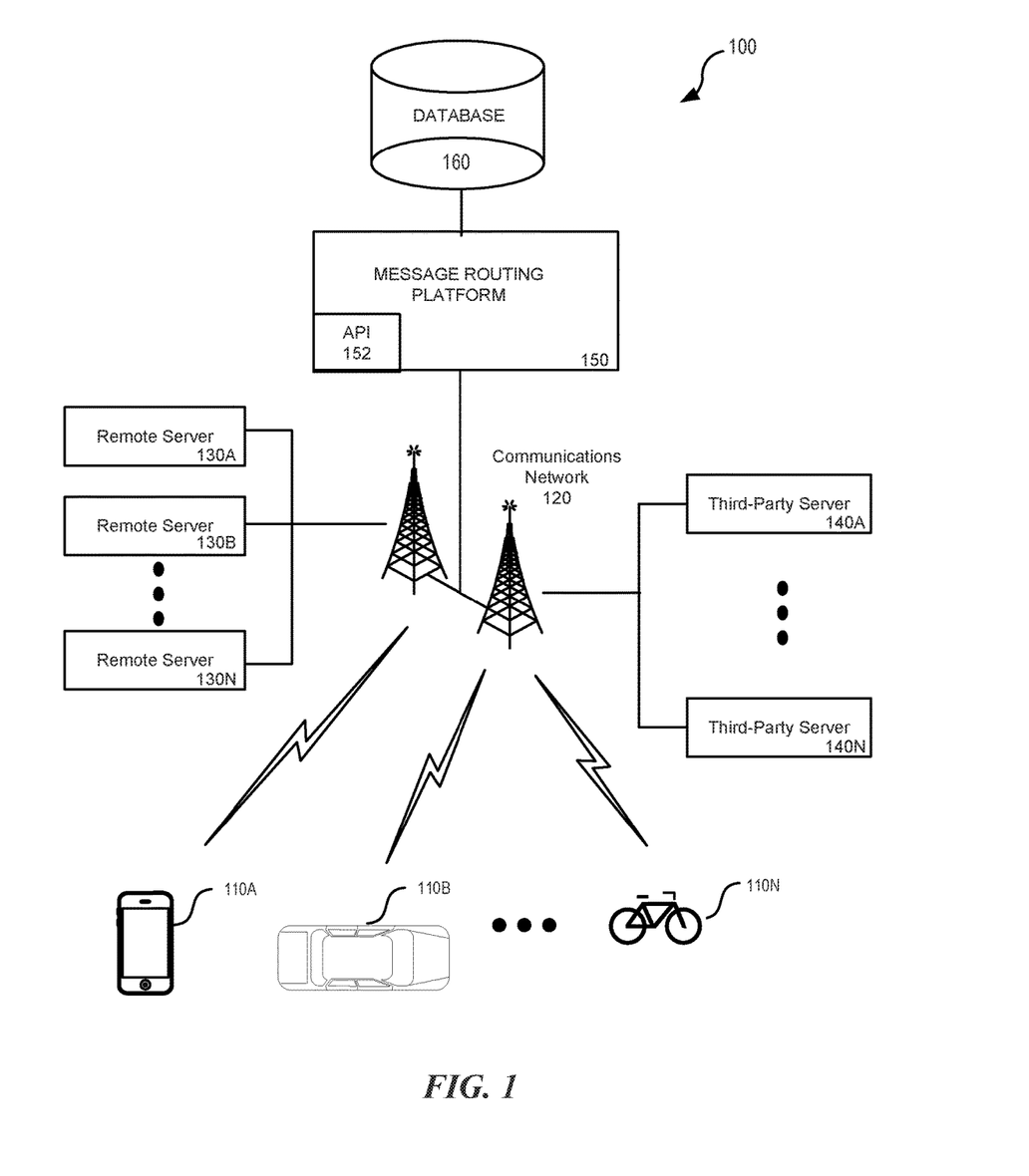
FIG. 1 illustrates a communication network, in accordance with various embodiments.

FIG. 1 illustrates an example of a communications environment 100 in which some embodiments of the present technology may be utilized. As illustrated in FIG. 1, communications environment 100 may include one or IoT devices 110A-110N (such as a mobile phone, automobile, refrigerator, sensor network, bicycle, tablet computer, mobile media device, mobile gaming device, vehicle-based computer, wearable computing device, etc.), communications network 120, remote application servers 130A-130N, third-party servers 140A-140N, message routing platform 150 and database 160.

IoT devices 110A-110N can include network communication components that enable the IoT devices to communicate with remote application servers 130A-130N, third-party servers 140A-140N, message routing platform 150, and/or other portable electronic devices by transmitting and receiving wireless signals using licensed, semi-licensed or unlicensed spectrum over communications network 120. In some cases, communication network 120 may be comprised of multiple networks, even multiple heterogeneous networks, such as one or more border networks, voice networks, broadband networks, service provider networks, Internet Service Provider (ISP) networks, and/or Public Switched Telephone Networks (PSTNs), interconnected via gateways operable to facilitate communications between and among the various networks. Communications network 120 can include base transceiver stations (BTS), HLR, Multimedia Messaging Service Centers (MMSC), SMSC, Gateway General Packet Radio Service (GPRS) support nodes (GGSN), and mobile switching centers (MSC). Communications network 120 can also include third-party communications networks such as a Global System for Mobile (GSM) mobile communications network, a code/time division multiple access (CDMA/TDMA) mobile communications network, a 3rd or 4th generation (3G/4G) mobile communications network (e.g., General Packet Radio Service (GPRS/EGPRS)), Enhanced Data rates for GSM Evolution (EDGE), Universal Mobile Telecommunications System (UMTS), or Long Term Evolution (LTE) network), or other communications network.

Those skilled in the art will appreciate that various other components (not shown) may be included in IoT devices 110A-110N to enable network communication. For example, an IoT device may be configured to communicate over a GSM mobile telecommunications network. As a result, the IoT device may include a Subscriber Identity Module (SIM) card that stores an IMSI number that is used to identify the mobile device on the GSM mobile communications network or other networks, for example, those employing 3G, 4G, and/or 5G wireless protocols. If the IoT device is configured to communicate over another communications network, the IoT device may include other components that enable it to be identified on the other communications networks.

In some embodiments, IoT devices 110A-110N may include components that enable them to connect to a communications network using Generic Access Network (GAN) or Unlicensed Mobile Access (UMA) standards and protocols. For example, a mobile device may include components that support Internet Protocol (IP)-based communication over a Wireless Local Area Network (WLAN) and components that enable communication with the telecommunications network over the IP-based WLAN. IoT devices 110A-110N may include one or more sensors and/or applications that need to transfer data or check-in with remote servers 130A-130N, third-party servers 140A-140N, and/or message routing platform 150.

In some embodiments, an owner of an IoT device can communicate with one or more remote servers 130A-130N with the aid of the message routing platform 150 via communications network 120. Message routing platform 150, in some embodiments, may be configured and/or programmed to generate, create, and/or publish an application programming interface (API) 152 configured to facilitate communication between one or more remote servers 130A-130N, third-party servers 140A-140N, and/or IoT devices 110A-110N. Message routing platform 150 can access database 160 to lookup the identity of an IoT device and identify a set of routing rules to route messages between remote servers 130A-130N, third-party servers 140A-140N, and/or IoT devices 110A-110N. In some cases, the API 152 is a REST web service API configured to be called by one or more remote servers 130A-130N.

Figure 2:
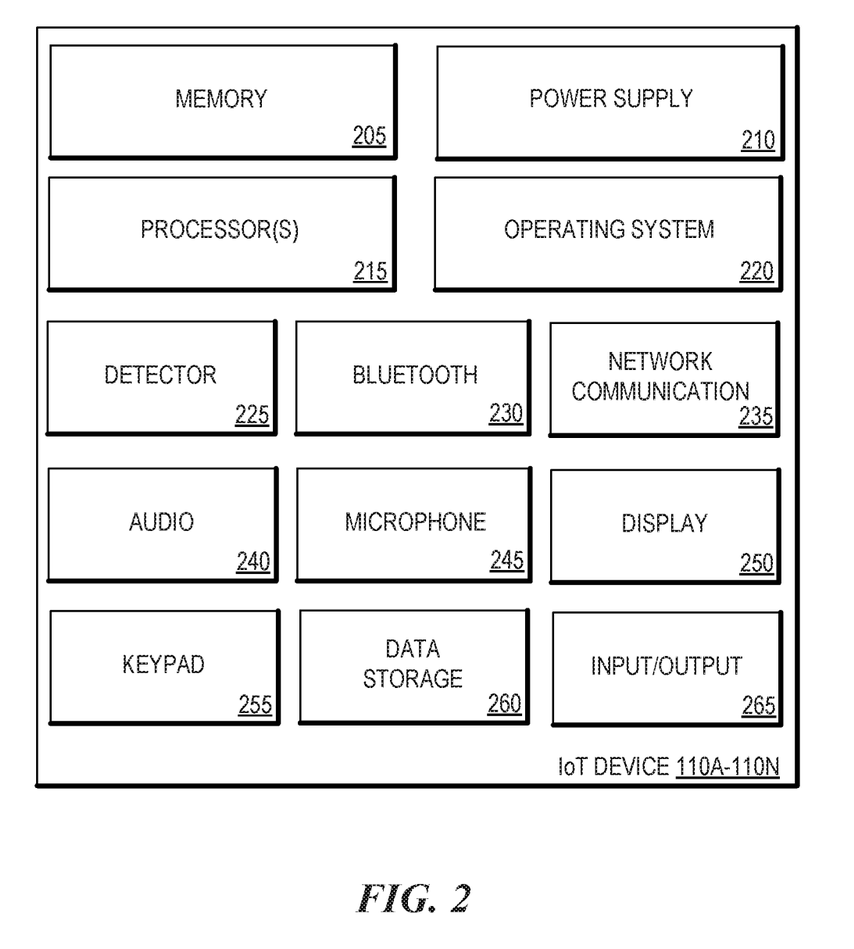
FIG. 2 illustrates a set of components within an IoT device according to one or more embodiments of the disclosed technology.

FIG. 2 illustrates a set of components of an IoT device 110A-110N according to one or more embodiments of the present technology. As shown in FIG. 2, IoT device 110A-110N may include memory 205 (e.g., volatile memory and/or nonvolatile memory), power supply 210 (e.g., battery), processor(s) 215 for executing processing instructions, and operating system 220. Additional components such as detectors and sensors 225, one or more network interfaces (e.g., Bluetooth Interface 230; and Network Communication Interface 235, which enables the IoT device to communicate by transmitting and receiving wireless signals using licensed, semi-licensed or unlicensed spectrum over a telecommunications network), audio interface 240, microphone 245, display 250, keypad or keyboard 255, data storage 260 (e.g., hard drive, flash memory, memory card, etc.), and other input and/or output interfaces 265. The various components of the IoT device may be interconnected via a bus.

Processor(s) 215 are the main processors of IoT device 110A-110N which may include application processors, baseband processors, various coprocessors, and other dedicated processors for operating IoT device 110A-110N. For example, an application processor can provide the processing power to support software applications, memory management, graphics processing, and multimedia. An application processor may be communicably coupled with memory 205 and configured to run the operating system, the user interface, and the applications stored on memory 205 or data storage component 260. A baseband processor may be configured to perform signal processing and implement/manage real-time radio transmission operations of IoT device 110A-110N. These processors along with the other components may be powered by power supply 210. The volatile and nonvolatile memories found in various embodiments may include storage media for storing information such as processor-readable instructions, data structures, program modules, or other data. Some examples of information that may be stored include basic input/output systems (BIOS), operating systems, and applications.

Figure 3:
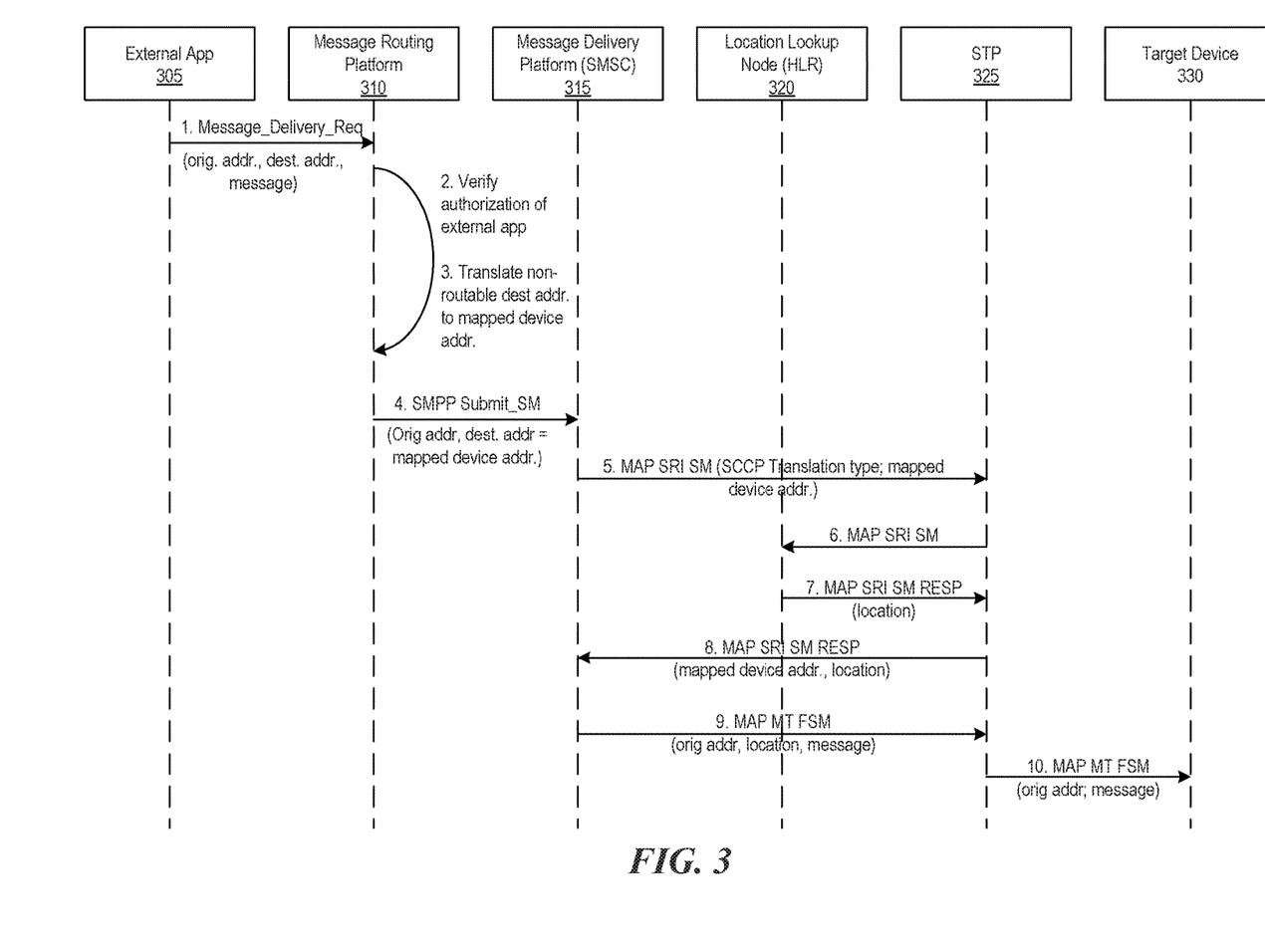
FIG. 3 is a sequence diagram illustrating communications between various components of the disclosed technology that may be utilized to handle the machine-to-machine message delivery from an external application to a target device according to one or more embodiments of the disclosed technology.

FIG. 3 is a sequence diagram illustrating communications between various components of the disclosed technology that may be utilized to handle the machine-to-machine message delivery from an external application to a target device. Steps 1-10 depict a procedure for sending a message (e.g., a Mobile Originated Forward Short Message ("MO_FSM")) from an external application (e.g., a third-party IoT service provider) to a target device (e.g., an IoT device) via a telecommunications network. At step 1, external application 305 calls an API 152, at the message routing platform 310, associated with routing messages (e.g., short messages (SM)) to the IoT devices 110A-N via a plan associated with the external application. The API may be configured to receive an originating identifier that uniquely identifies the external application 305 (e.g., a shortcode agreed upon between the communications service provider and external application 305), a destination address identifier of a target device 330, and a message to be delivered to the target device 330. The destination address is not routable on the communications network. Instead, it is a predefined non-routable (e.g., dummy) number that is associated with a target device.

At step 2, message routing platform 310 verifies that external application 305 is a subscriber of the telecommunications service provider and is authorized to transmit messages to the target device 330. For example, message routing platform 310 receives credential information (e.g., originating identifier) from external application 305, queries one or more databases (e.g., subscriber databases) to determine whether external application is a subscriber of one or more plans, and authorize the user associated with the external application as the subscriber of the telecommunications service provider based on the requested credential information. Message routing platform 310 can also query one or more databases (e.g., IoT device databases) to verify that external application 305 is authorized to send and/or receive messages to target device 330 based on the requested credential information and the identity of the target device. For example, a first IoT service provider may be authorized to send and/or receive messages to IoT devices that it has provisioned (or are within its network), and not authorized to exchange messages with IoT devices provisioned by another IoT service provider. An external application may be associated with a range of mapped device addresses that are assigned to that particular external application. For example, a first IoT service provider may be associated with mapped device addresses in the following range: 2320370XX-2320379XX, and a second IoT service provider may be associated with mapped device addresses in the following range: 2320380XX-2320389XX. Message routing platform 310 can verify, based on the originating identifier of external application 305, that the destination address identifier of target device 330 is within an approved range of destination addresses associated with external application 305.

Figure 5:
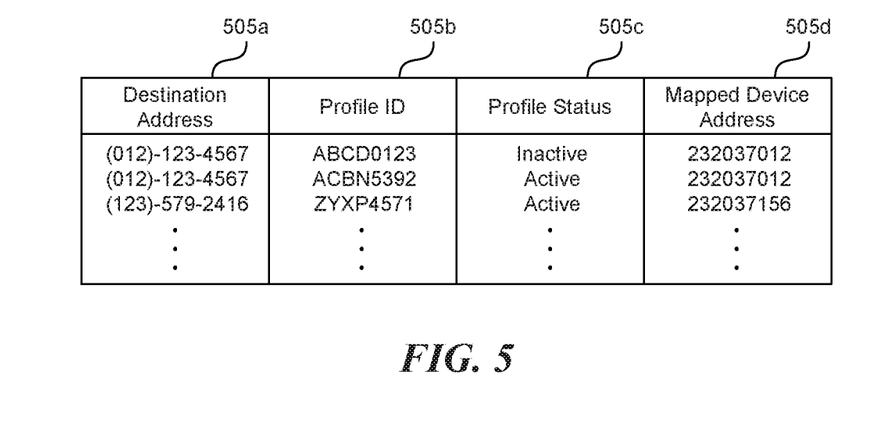
FIG. 5 illustrates properties associated with destination addresses according to one or more embodiments of the disclosed technology.
Figure 6:
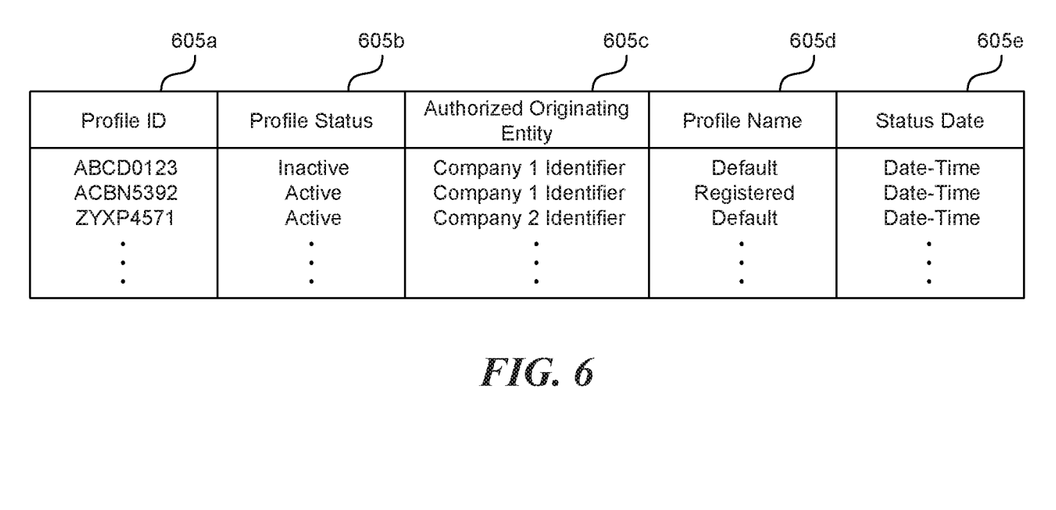
FIG. 6 illustrates properties associated with device profiles according to one or more embodiments of the disclosed technology.

At step 3, message routing platform 310 translates the non-routable destination address identifier of the target device to a mapped device address associated with the target device. Mapped device addresses are maintained internally by the message routing platform (or by another third party) and are generally not published to external parties (e.g., the third-party that originated the message). In some embodiments, message routing platform 310 queries one or more databases and/or network nodes to discover the best target device identity to use to deliver the message to target device 330. Message routing platform 310 discovers a current active profile associated with the target device, based on the destination address identifier, and uses that information to identify an appropriate mapped device address to route the message(s) to the target device. For example, as illustrated in FIGS. 5 and 6, the following information about one or more target device profiles can be accessed by message routing platform 310: destination address identifier 505a, profile identifier 505b/605a, profile status 505c/605b, mapped device address 505d, authorized originating entity 605c, profile name 605d, and status date/time 605e. For example, upon receiving a message delivery request, via API 152, for destination address identifier (012)-123-4567, message routing platform 310 can select mapped device address 232037012 corresponding to the profile with an active status (profile identifier: ACBN5392).

In some embodiments, the same range of mapped device addresses may be associated with two or more external applications. For example, the same range of mapped device addresses, 2320370XX-2320379XX, is associated with IoT service provider 1 and IoT service provider 2. In such cases, message routing platform 310 may append an external application identifier with a mapped device address to generate a unique mapped destination address that can then be used to uniquely identify one or more target devices and route messages to and from them.

After generating a unique mapped device address, at step 4, message routing platform 310 submits the message to, for example, the telecommunication network provider's message delivery platform (e.g., SMSC, Rich Communication Services (RCS), Interface Message Processor (IMP)). The message can be delivered to other network nodes (e.g., MMSC, GPRS, etc.) based on a type of the message. While the description below refers to the SMSC, one of skill in the art would understand that the process could be similarly implemented for other message delivery platforms.

A submit_sm messaging unit at the SMSC comprises the following parameters: source address (populated with the originating identifier) and destination address (populated with the mapped device address). In some embodiment, the telecommunication network provider's SMSC may be further programmed to recognize that the destination address is an IMSI instead of a MSISDN.

Upon receipt, SMSC 315 verifies that the incoming message is acceptable and transmits SRI SM (Send Routing Information for Short Message) for MT FSM (Mobile Terminating Forward Short Message) with the mapped device address and translation type indicating a machine-to-machine message transmission (step 5). For example, SMSC 315 only accepts incoming messages from a trusted SMPP bind (e.g., predetermined SMPP credentials agreed upon with external application 305) or incoming messages that include a trusted shortcode (e.g., only messages from agreed upon shortcodes in the originating identifier field are allowed). In some embodiments, SMSC 315 does not query its own database to lookup record of destination address (e.g., IMSI of target device 330). SMSC 315 constructs a MAP SRI SM toward a location lookup node (e.g., HSS/HLR) 320 via STP 315 with the mapped device address (step 6). SMSC 315 also populates the called SCCP party's translation type with a translation type that signifies to the network that the incoming message is both trusted and of a machine-to-machine message transmission type so that STP 315 and location lookup node (e.g., HSS/HLR) 320 do not drop the message. Instead, STP 315 and location lookup node (e.g., HSS/HLR) 320 move forward with returning the location of the target device per SRI SM flow. For example, even though the mapped device address (e.g., IMSI address) of target device 330 may not be otherwise routable/active (so in a traditional system, STP 325 would stop and not query location lookup node (e.g., HSS/HLR) 320), STP 325 would, upon determining that the incoming message is of a machine-to-machine message transmission type, query location lookup node (e.g., HSS/HLR) 320 (step 6) to identify a location (e.g., stored in the VLR) of target device 330 (e.g., stored in location lookup node (e.g., HSS/HLR) 320 when target device 330 was registered).

Location lookup node (e.g., HSS/HLR) 320 will then send SRI SM RESP back to SMSC 315 that contains both mapped device address and location of target device 330 (steps 7 and 8). With knowledge of both the location and mapped device address of target device 330, SMSC 315 initiates the MT FSM portion of the messaging call flow (steps 9 and 10).

Figure 4:
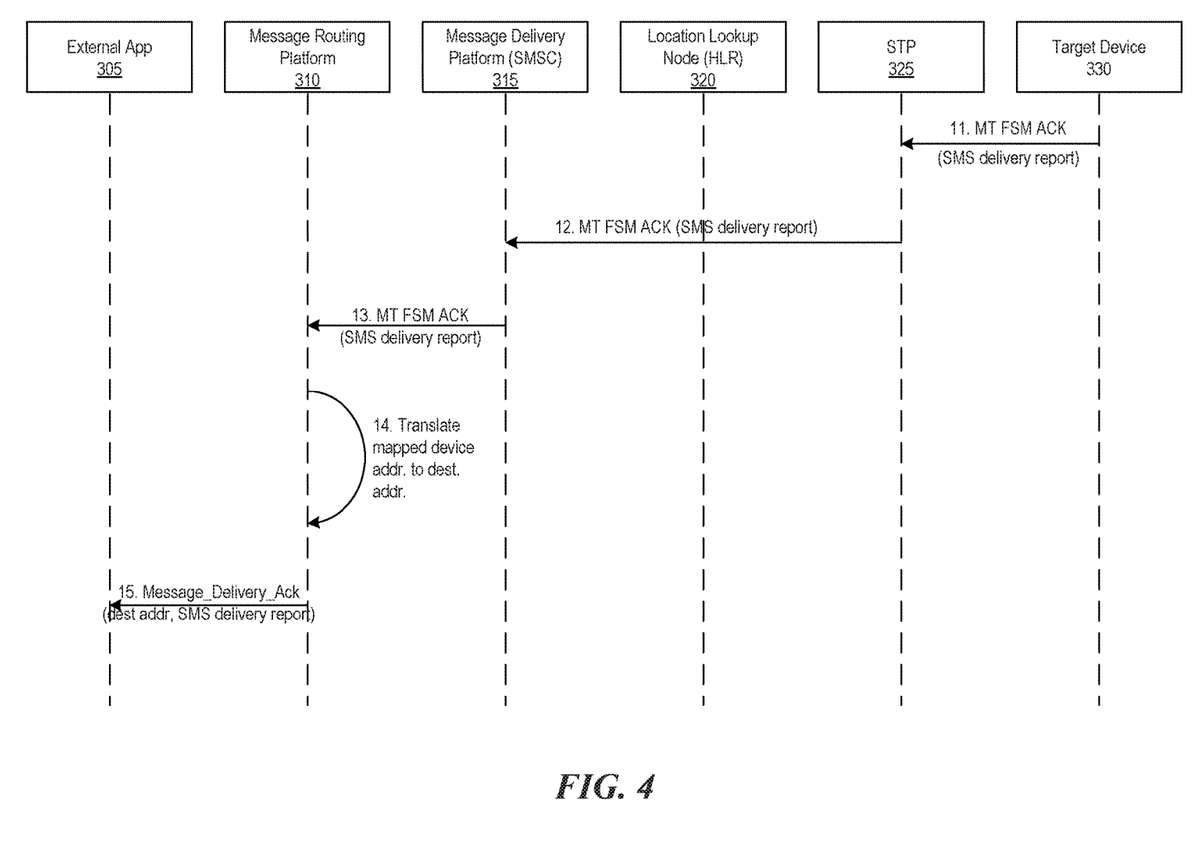
FIG. 4 is a sequence diagram illustrating communications between various components of the disclosed technology that may be utilized to handle the machine-to-machine message delivery acknowledgment from a target device to an external application according to one or more embodiments of the disclosed technology.

FIG. 4 is a sequence diagram illustrating communications between various components of the disclosed technology that may be utilized to handle the machine-to-machine message delivery acknowledgment from a target device to an external application. Once the message is successfully delivered to target device 330, an acknowledgment indicating success or failure (e.g., SMS Delivery Report) is sent toward message routing platform 310 via STP 325, HLR 320, and SMSC 315 (steps 11, 12, and 13). The acknowledgment comprises mapped device address and/or location of target device 330. Message routing platform 310 performs a reverse translation to determine the non-routable destination address associated with the target device, based on the mapped device address and/or location received with the acknowledgment (step 14). In some embodiments, message routing platform 310 is stateful such that it does not need to explicitly perform the reverse translation. Instead, message routing platform 310 knows the identity (e.g., non-routable destination address) of the target device for which the message delivery request was received (at step 1). Message routing platform forwards the message delivery acknowledgment to external application 305 (step 15). In this manner, non-routable numbers (or other unique identifiers) can be utilized to service a highly scalable machine-to-machine message routing platform.

Exemplary Computer System Overview

Aspects and implementations of the routing system of the disclosure have been described in the general context of various steps and operations. A variety of these steps and operations may be performed by hardware components or may be embodied in computer-executable instructions, which may be used to cause a general-purpose or special-purpose processor (e.g., in a computer, server, or other computing device) programmed with the instructions to perform the steps or operations. For example, the steps or operations may be performed by a combination of hardware, software, and/or firmware.

Figure 7:
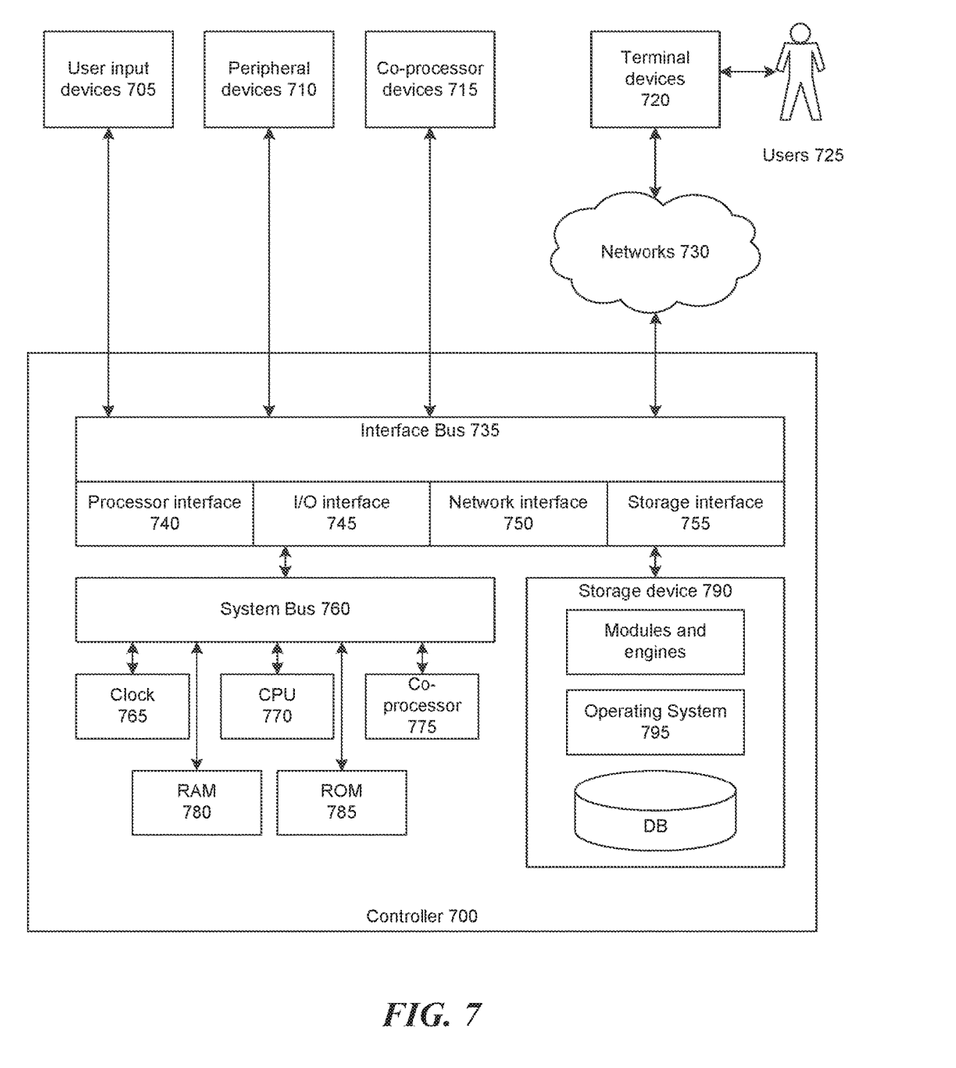
FIG. 7 is a block diagram illustrating a computer systemization according to one or more embodiments of the disclosed technology.

FIG. 7 is a block diagram illustrating an example machine representing the computer systemization of the routing system. The routing controller 700 may be in communication with entities including one or more users 725, client/terminal/IoT devices 720 (e.g., devices 110A-110N), user input devices 705, peripheral devices 710, an optional co-processor device(s) (e.g., cryptographic processor devices) 715, and networks 730 (e.g., 120 in FIG. 1). Users may engage with the controller 700 via terminal devices 720 over networks 730.

Computers may employ central processing unit (CPU) or processor to process information. Processors may include programmable general-purpose or special-purpose microprocessors, programmable controllers, application-specific integrated circuits (ASICs), programmable logic devices (PLDs), embedded components, combination of such devices and the like. Processors execute program components in response to user and/or system-generated requests. One or more of these components may be implemented in software, hardware or both hardware and software. Processors pass instructions (e.g., operational and data instructions) to enable various operations.

The controller 700 may include clock 765, CPU 770, memory such as read only memory (ROM) 785 and random access memory (RAM) 780 and co-processor 775 among others. These controller components may be connected to a system bus 760, and through the system bus 760 to an interface bus 735. Further, user input devices 705, peripheral devices 710, co-processor devices 715, and the like, may be connected through the interface bus 735 to the system bus 760. The interface bus 735 may be connected to a number of interface adapters such as processor interface 740, input output interfaces (I/O) 745, network interfaces 750, storage interfaces 755, and the like.

Processor interface 740 may facilitate communication between co-processor devices 715 and co-processor 775. In one implementation, processor interface 740 may expedite encryption and decryption of requests or data. Input output interfaces (I/O) 745 facilitate communication between user input devices 705, peripheral devices 710, co-processor devices 715, and/or the like and components of the controller 700 using protocols such as those for handling audio, data, video interface, wireless transceivers, or the like (e.g., Bluetooth, IEEE 1394a-b, serial, universal serial bus (USB), Digital Visual Interface (DVI), 802.11a/b/g/n/x, cellular, etc.). Network interfaces 750 may be in communication with the network 730. Through the network 730, the controller 700 may be accessible to remote terminal devices 720. Network interfaces 750 may use various wired and wireless connection protocols, such as direct connect, Ethernet, wireless connection such as IEEE 802.11a-x, and the like.

Examples of network 730 include the Internet, Local Area Network (LAN), Metropolitan Area Network (MAN), a Wide Area Network (WAN), wireless network (e.g., using Wireless Application Protocol WAP), a secured custom connection, and the like. The network interfaces 750 can include a firewall which can, in some aspects, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand. Other network security functions performed or included in the functions of the firewall, can be, for example, but are not limited to, intrusion-prevention, intrusion detection, next-generation firewall, personal firewall, etc., without deviating from the novel art of this disclosure.

Storage interfaces 755 may be in communication with a number of storage devices such as storage devices 790, removable disc devices, and the like. The storage interfaces 755 may use various connection protocols such as Serial Advanced Technology Attachment (SATA), IEEE 1394, Ethernet, Universal Serial Bus (USB), and the like.

User input devices 705 and peripheral devices 710 may be connected to I/O interface 745 and potentially other interfaces, buses and/or components. User input devices 705 may include card readers, finger print readers, joysticks, keyboards, microphones, mouse, remote controls, retina readers, touch screens, sensors, and/or the like. Peripheral devices 710 may include antenna, audio devices (e.g., microphone, speakers, etc.), cameras, external processors, communication devices, radio frequency identifiers (RFIDs), scanners, printers, storage devices, transceivers, and/or the like. Co-processor devices 715 may be connected to the controller 700 through interface bus 735, and may include microcontrollers, processors, interfaces or other devices.

Computer executable instructions and data may be stored in memory (e.g., registers, cache memory, random access memory, flash, etc.) which is accessible by processors. These stored instruction codes (e.g., programs) may engage the processor components, motherboard and/or other system components to perform desired operations. The controller 700 may employ various forms of memory including on-chip CPU memory (e.g., registers), RAM 780, ROM 785, and storage devices 790. Storage devices 790 may employ any number of tangible, non-transitory storage devices or systems such as fixed or removable magnetic disk drive, an optical drive, solid state memory devices and other processor-readable storage media. Computer-executable instructions stored in the memory may include the message routing platform 150 having one or more program modules such as routines, programs, objects, components, data structures, and so on that perform particular tasks or implement particular abstract data types. For example, the memory may contain operating system (OS) component 795, modules and other components, database tables, and the like. These modules/components may be stored and accessed from the storage devices, including from external storage devices accessible through an interface bus.

The database components can store programs executed by the processor to process the stored data. The database components may be implemented in the form of a database that is relational, scalable and secure. Examples of such database include DB2, MySQL, Oracle, Sybase, and the like. Alternatively, the database may be implemented using various standard data-structures, such as an array, hash, list, stack, structured text file (e.g., XML), table, and/or the like. Such data-structures may be stored in memory and/or in structured files.

The controller 700 may be implemented in distributed computing environments, where tasks or modules are performed by remote processing devices, which are linked through a communications network, such as a Local Area Network ("LAN"), Wide Area Network ("WAN"), the Internet, and the like. In a distributed computing environment, program modules or subroutines may be located in both local and remote memory storage devices. Distributed computing may be employed to load balance and/or aggregate resources for processing. Alternatively, aspects of the controller 700 may be distributed electronically over the Internet or over other networks (including wireless networks). Those skilled in the relevant art(s) will recognize that portions of the notification system may reside on a server computer, while corresponding portions reside on a client computer. Data structures and transmission of data particular to aspects of the controller 700 are also encompassed within the scope of the disclosure.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

The invention claimed is:

1. A computer-implemented method in a mobile telecommunications network to route messages to a target Internet of Things (IoT) device using non-routable identifiers, the method comprising:
   receiving, via a published application programming interface (API) and from a message originator that calls the API, an incoming message to be delivered to the target IoT device,
      wherein the API is associated with a telecommunications service provider that provides telecommunications services to subscribers who desire access to the mobile telecommunications network, and
      wherein the incoming message comprises a destination address of the target IoT device that is not routable on the mobile telecommunications network;
   in response to determining that the destination address of the target IoT device is not routable, translating the non-routable destination address to a mapped device address of the target IoT device,
      wherein translating the non-routable destination address to the mapped destination address of the target IoT device is based on a type of an identifier of the non-routable destination address;

determining a location identifier of the target IoT device from a location lookup node of the telecommunications service provider based on the mapped device address; and routing the incoming message to the target IoT device using the determined location identifier of the target IoT device.

2. The method of claim 1, wherein the destination address comprises a:

Mobile Station International Subscriber Directory Number (MSISDN),
International Mobile Subscriber Identity (IMSI),
IP address,
embedded identifier,
Apple SIM,
serial number,
phone number,
Session Initiation Protocol (SIP) Uniform Resource Identifier (URI),
or any combination thereof.

3. The method of claim 1, wherein the mapped device address of the target IoT device comprises a:

Mobile Station International Subscriber Directory Number (MSISDN),
International Mobile Subscriber Identity (IMSI),
IP address,
embedded identifier,
Apple SIM,
serial number,
phone number,
Session Initiation Protocol (SIP) Uniform Resource Identifier (URI),
or any combination thereof.

4. The method of claim 1, further comprising:
requesting credential information from the message originator; and
authorizing the message originator as a subscriber of the telecommunications service provider based on the requested credential information.

5. The method of claim 1, wherein determining the location of the target IoT device from the location lookup node comprises:
evaluating a type of translation to verify that the incoming message is a machine-to-machine transmission.

6. The method of claim 1, further comprising:
receiving a delivery notification in response to delivering the incoming message to the target IoT device using the location identifier;
translating a mapped device address in the delivery notification to the destination address of the target IoT device;
generating a message delivery notification comprising the destination address of the target IoT device and at least a portion of the delivery notification;
transmitting, via the API, to the message originator, the message delivery notification.

7. The method of claim 1, wherein the location identifier is retrieved from a visitor location register (VLR).

8. A system for routing messages to a target Internet of Things (IoT) device using non-routable identifiers, the system comprising:
a hardware processor;
a communications port coupled to the hardware processor;
a non-transitory computer-readable medium coupled to the hardware processor and storing instructions that, when executed by the hardware processor, cause a message routing platform to:
receive, via a published application programming interface (API), and from a message originator that calls the API, an incoming message to be delivered to the target IoT device,
wherein the API is associated with a telecommunications service provider that provides telecommunications services to subscribers who desire access to a mobile telecommunications network, and
wherein the incoming message comprises a destination address of the target IoT device that is not routable on the mobile telecommunications network;
in response to determining that the destination address of the target IoT device is not routable, translate the non-routable destination address to a mapped device address of the target IoT device,
wherein translating the non-routable destination address to the mapped destination address of the target IoT device is based on a type of an identifier of the non-routable destination address;
determine a location identifier of the target IoT device from a location lookup node of the telecommunications service provider based on the mapped device address; and
route the incoming message to the target IoT device using the determined location identifier of the target IoT device.

9. The system of claim 8, wherein the destination address comprise a:
Mobile Station International Subscriber Directory Number (MSISDN),
International Mobile Subscriber Identity (IMSI),
IP address,
embedded identifier,
Apple SIM,
serial number,
phone number,
Session Initiation Protocol (SIP) Uniform Resource Identifier (URI),
or any combination thereof.

10. The system of claim 8, wherein the mapped device address of the target IoT device comprise a:
Mobile Station International Subscriber Directory Number (MSISDN),
International Mobile Subscriber Identity (IMSI),
IP address,
embedded identifier,
Apple SIM,
serial number,
phone number,
Session Initiation Protocol (SIP) Uniform Resource Identifier (URI),
or any combination thereof.

11. The system of claim 8, wherein the instructions, when executed by the processor, further cause the message routing platform to:
request credential information from the message originator; and
authorize the message originator as a subscriber of the telecommunications service provider based on the requested credential information.

12. The system of claim 8, wherein the message routing platform determines the location of the target IoT device from the location lookup node in part by:

evaluating a type of translation to verify that the incoming message is a machine-to-machine transmission.

13. The system of claim 8, wherein the instructions, when executed by the processor, further cause the message routing platform to:
receive a delivery notification in response to delivering the incoming message to the target IoT device using the location identifier;
translate a mapped device address in the delivery notification to the destination address of the target IoT device;
generate a message delivery notification comprising the destination address of the target IoT device and at least a portion of the delivery notification;
transmit, via the API, to the message originator, the message delivery notification.

14. The system of claim 8, wherein the location identifier is retrieved from a visitor location register (VLR).

15. A non-transitory computer-readable medium storing instructions that, when executed by a processor in a mobile telecommunications network, cause the network to execute a method to route messages to a target Internet of Things (IoT) device using non-routable identifiers, the method comprising:
receiving, via a published application programming interface (API), and from a message originator that calls the API, an incoming message to be delivered to the target IoT device,
wherein the API is associated with a subscriber system of a telecommunications service provider that provides telecommunications services to subscribers who desire access to the mobile telecommunications network, and
wherein the incoming message comprises a destination address of the target IoT device that is not routable on the mobile telecommunications network;
in response to determining that the destination address of the target IoT device is not routable, translating the non-routable destination address to a mapped device address of the target IoT device,
wherein translating the non-routable destination address to the mapped destination address of the target IoT device is based on a type of an identifier of the non-routable destination address;
determining a location identifier of the target IoT device from a location lookup node based on the mapped device address; and
routing the incoming message to the target IoT device using the determined location identifier of the target IoT device.

16. The non-transitory computer-readable medium of claim 15, wherein the destination address comprise a:

Mobile Station International Subscriber Directory Number (MSISDN),
International Mobile Subscriber Identity (IMSI),
IP address,
embedded identifier,
Apple SIM,
serial number,
phone number,
Session Initiation Protocol (SIP) Uniform Resource Identifier (URI),
or any combination thereof.

17. The non-transitory computer-readable medium of claim 15, wherein the mapped device address of the target IoT device comprise a:
Mobile Station International Subscriber Directory Number (MSISDN),
International Mobile Subscriber Identity (IMSI),
IP address,
embedded identifier,
Apple SIM,
serial number,
phone number,
Session Initiation Protocol (SIP) Uniform Resource Identifier (URI),
or any combination thereof.

18. The non-transitory computer-readable medium of claim 15, wherein the method further comprises:
requesting credential information from the message originator; and
authorizing the message originator as a subscriber of the telecommunications service provider based on the requested credential information.

19. The non-transitory computer-readable medium of claim 15, wherein determining the location of the target IoT device from the location lookup node further comprises:
evaluating a type of translation to verify that the incoming message is a machine-to-machine transmission.

20. The non-transitory computer-readable medium of claim 15, wherein the method further comprises:
receiving a delivery notification in response to delivering the incoming message to the target IoT device using the location identifier;
translating a mapped device address in the delivery notification to the destination address of the target IoT device;
generating a message delivery notification comprising the destination address of the target IoT device and at least a portion of the delivery notification;
transmitting, via the API, to the message originator, the message delivery notification.

* * * * *